(12) United States Patent
Wang et al.

(10) Patent No.: US 7,369,928 B2
(45) Date of Patent: May 6, 2008

(54) AUTOMATICALLY ADJUSTING HEAD RESTRAINT SYSTEM

(75) Inventors: Jenne-Tai Wang, Rochester, MI (US); Dorel M. Sala, Troy, MI (US); Gary L. Jones, Farmington Hills, MI (US); Joseph D. Mc Cleary, Clinton Township, Macomb County, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 325 days.

(21) Appl. No.: 11/121,832

(22) Filed: May 4, 2005

(65) Prior Publication Data

US 2006/0250016 A1    Nov. 9, 2006

(51) Int. Cl.
*B60R 21/00* (2006.01)
*G06F 17/00* (2006.01)

(52) U.S. Cl. .......................................... 701/49; 180/271
(58) Field of Classification Search ...................... None
See application file for complete search history.

(56) References Cited

U.S. PATENT DOCUMENTS

| 4,645,233 | A | * | 2/1987 | Bruse et al. | 280/801.2 |
| 4,797,824 | A | * | 1/1989 | Sugiyama et al. | 701/49 |
| 5,706,144 | A | * | 1/1998 | Brandin | 359/843 |
| 5,748,473 | A | * | 5/1998 | Breed et al. | 701/45 |
| 5,848,661 | A | * | 12/1998 | Fu | 180/273 |
| 6,088,640 | A | * | 7/2000 | Breed | 701/45 |
| 6,471,296 | B2 | * | 10/2002 | Lance | 297/410 |
| 6,840,637 | B2 | | 1/2005 | Wang | 359/843 |
| 2003/0090133 | A1 | * | 5/2003 | Nathan et al. | 297/217.3 |

FOREIGN PATENT DOCUMENTS

GB    2320426 A    *    6/1998

OTHER PUBLICATIONS

Platzer, George; A Simple Way to Prevent Blindzone Accidents, Public Service Information from SAE International, 1996, 4 pgs.

* cited by examiner

*Primary Examiner*—Michael J. Zanelli

(57) ABSTRACT

A headrest positioning system for automatically adjusting the position of a headrest of a vehicle seat. The headrest can be a power headrest that is part of a power seat system, where the position of the headrest can be preset by a seat occupant with the other positions of the seat in a memory function. The system includes a seat occupant sensing system that senses the position of the seat occupant's head, eyes or other facial features to determine a desired position of the headrest. The system compares the actual position of the headrest to the desired position, and automatically adjusts the position of the headrest to the desired position. In one embodiment, an imaging system determines the position of the seat occupant's head. In another embodiment, the system determines the position of seat occupant's eyes based on the position of the driver side mirror.

22 Claims, 6 Drawing Sheets

AUTOMATICALLY ADJUSTING HEAD RESTRAINT SYSTEM

BACKGROUND OF THE INVENTION

1. Field of the Invention

This invention relates generally to a headrest positioning system for automatically positioning a vehicle seat headrest and, more particularly, to a headrest positioning system for automatically positioning a vehicle seat headrest by detecting the position of the head or facial feature of a seat occupant to determine a desired position of the headrest, and comparing the desired position of the headrest to a sensed position of the headrest.

2. Discussion of the Related Art

Most vehicle seats employ a headrest positioned behind the head of a seated occupant. Known vehicle seat headrests are adjustable relative to the seat back so that the seat occupant can manually position the headrest at the proper location. Typically the headrest is slidably positionable relative to the seat back by an actuating device that moves a headrest support into and out of the seat back. It is desirable to provide a system that automatically adjusts the headrest relative to a particular seat occupant without intervention from the occupant.

SUMMARY OF THE INVENTION

In accordance with the teachings of the present invention, a headrest positioning system is disclosed for automatically positioning a headrest of a vehicle seat. In one embodiment, the headrest is a power headrest that is part of a power seat system, where the position of the headrest can be preset by the seat occupant with other positions of the seat in a memory function. The positioning system includes a sensing system that senses the position of the seat occupant's head, eyes or other facial features to determine a desired position of the headrest. The system compares the actual position of the headrest to the desired position, and automatically adjusts the position of the headrest to the desired position. In one embodiment, an imaging system determines the position of the seat occupant's head. In another embodiment, the system determines the position of the seat occupant's eyes based on the position of the driver side mirror. The system can determine the position of the driver side mirror for both a blind zone side mirror setting method and a blind zone/glare elimination side mirror setting method. The automatic operation of the headrest positioning system can be manually over-ridden to allow the seat occupant to adjust the headrest to another position.

Additional advantages and features of the present invention will become apparent from the following description and appended claims taken in conjunction with the accompanying drawings.

DETAILED DESCRIPTION OF THE EMBODIMENTS

The following discussion of the embodiments of the invention directed to a system for automatically positioning a vehicle seat headrest is merely exemplary in nature, and is in no way intended to limit the invention or its applications or uses.

Figure 1:
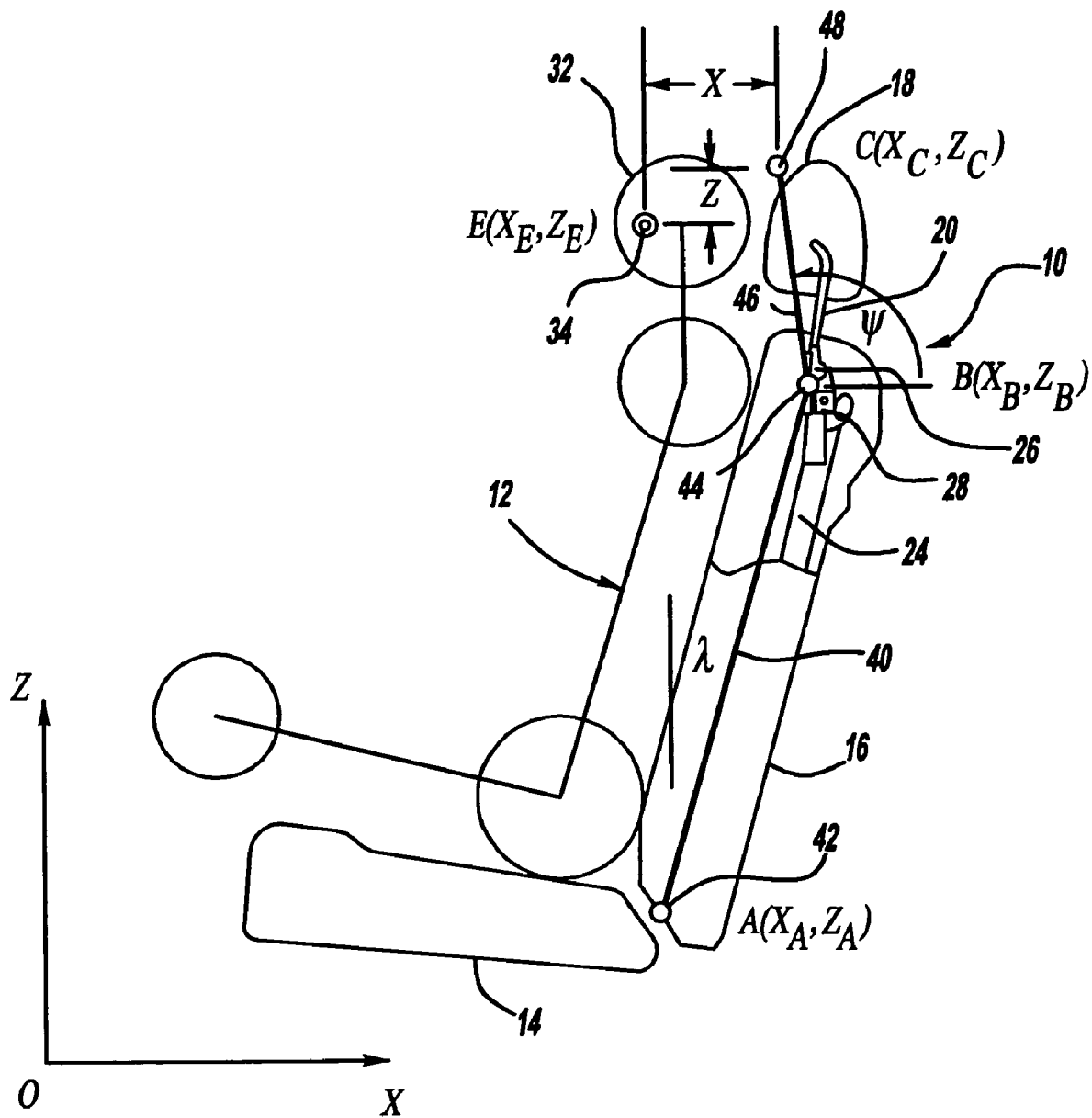
FIG. 1 is a side plan view of a vehicle seat including an automatic power headrest positioning system, according to an embodiment of the present invention.

FIG. 1 is a side view of a vehicle seat 10 for supporting a seat occupant 12 in a vehicle. The vehicle seat 10 includes a seat cushion 14, a seat back 16, a headrest 18 and a headrest support 20. The headrest support 20 is mounted to a seat back support structure 24 positioned in the seat back 16 by a linear actuator 26, including a sensor, and a rotational actuator 28, including a sensor. The actuators 26 and 28 can be any actuator suitable for positioning the headrest 18 for the automatic headrest positionable system discussed below. The seat occupant 12 includes a head 32 and eyes 34.

As will be discussed in detail below, the present invention proposes automatically positioning the headrest 18 relative to the seat occupant 12 based on the sensed position of a feature of the seat occupant 12, such as the seat occupant's head 32, eyes 34, nose, etc., so it is in a desired position. In one embodiment, it is only the drivers headrest that: is automatically adjusted based on the position of the driver's feature. This automatic adjustment of the drivers headrest can serve as a headrest adjustment reminder for other occupants in the vehicle whose headrests are not automatically positioned.

To provide the calculations to determine the proper position of the headrest 18 based on the position of the seat occupant 12, an axis 40 extending through the seat cushion 16 is defined from a bottom point 42 of the seat back 16 to a point 44 relative to the actuators 26 and 28. Additionally, an axis 46 is defined between a reference point 48 at the top of the headrest 18 to the point 44. The calculations are performed in an x-y-z reference frame relative to the seat 10. Z is the distance from the seat occupant's eyes 34 to the point 48 in the z-direction and X is the distance from the seat occupant's eyes 34 to the point 48 in the x-direction. It is within the scope of the present invention that the distance from another feature of the seat occupant 12 to the reference point C can be used. For the analysis below, point 42 is A, point 44 is B, point 48 is C and the point at the eyes 34 is E.

From these variables the following constraint equations can be provided:

$$x_c = x_E + X \quad (1)$$

$$y_c = z_E + Z \quad (2)$$

Also, the following kinematic equations can be defined:

$$x_C = x_A + \overline{AB} \cdot \cos\omega + \overline{BC} \cdot \cos\Psi \quad (3)$$

$$z_C = z_A + \overline{AB} \cdot \sin\omega + \overline{BC} \cdot \sin\Psi \quad (4)$$

where $\omega = \dfrac{\pi}{2} - \lambda$

According to one embodiment of the present invention, the headrest 18 is pivotable forward and backward by the rotational actuator 28 where the angle $\Psi$ is adjustable. Additionally, the headrest 18 is adjustable up and down by the linear actuator 26 where the length ($\overline{AB}$) of the axis 40 between the points 42 and 44 is adjustable. In this embodiment, the position ($\overline{AB},\Psi$) of the headrest 18 is determined from the following equations.

$$\overline{AB} = \frac{x_C - x_A - \overline{BC} \cdot \cos\Psi}{\cos\omega} \quad (5)$$

$$\Psi = \omega + \sin^{-1}\left[\frac{(z_C - z_A)\cdot\cos\omega - (x_C - x_A)\cdot\sin\omega}{\overline{BC}}\right] \quad (6)$$

$$x_B = x_A + \overline{AB}\cdot\cos\omega \quad (7)$$

$$z_B = z_A + \overline{AB}\cdot\sin\omega \quad (8)$$

According to another embodiment of the present invention, the headrest 18 is pivotable forward and backward by the rotational actuator 28 where the angle $\Psi$ is adjustable, and the length ($\overline{BC}$) of the axis 46 is adjustable by the linear actuator 26. For this embodiment, the following equations are used to determine the position ($\overline{BC},\Psi$) of the headrest 18.

$$\overline{BC} = \frac{x_C - x_A - \overline{AB}\cdot\cos\omega}{\cos\Psi} \quad (9)$$

$$\Psi = \tan^{-1}\left[\frac{z_C - z_A - \overline{AB}\cdot\sin\omega}{x_C - x_A - \overline{AB}\cdot\cos\omega}\right] \quad (10)$$

Figure 2:
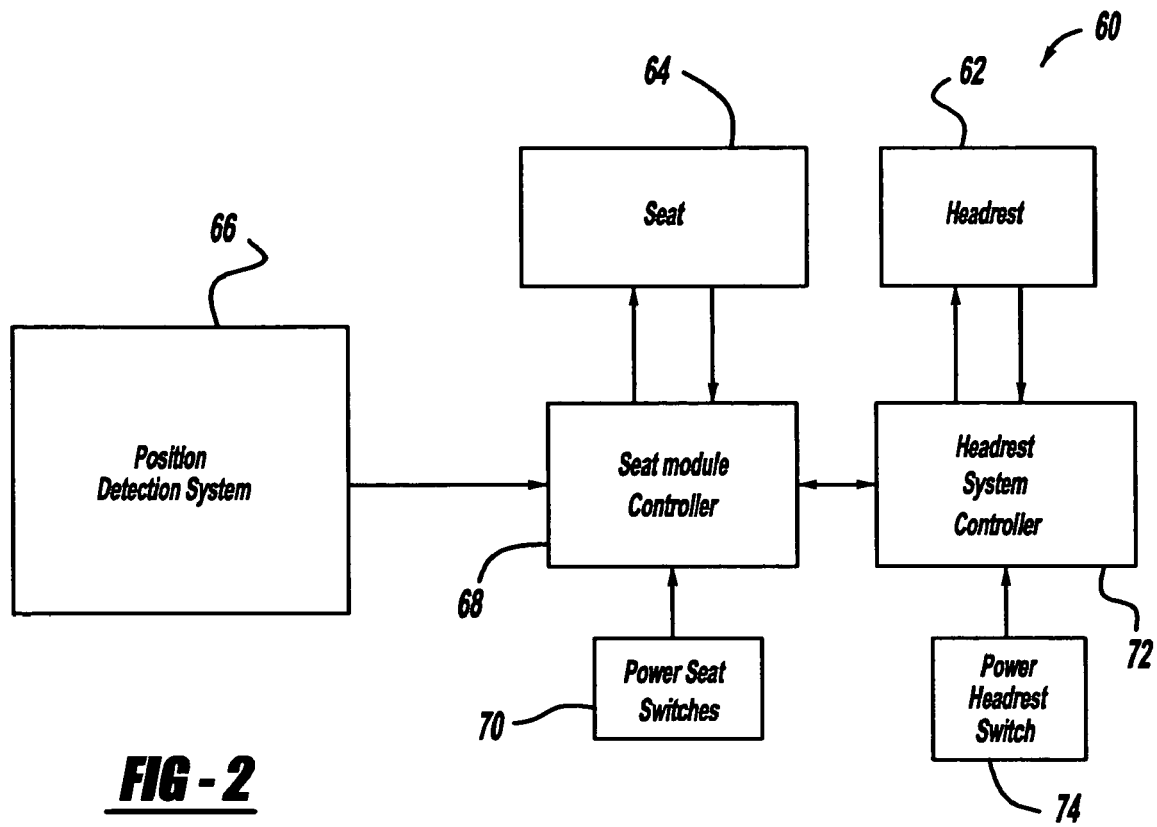
FIG. 2 is a block diagram of an automatic power headrest positioning system for automatically positioning the headrest based on the position of the seat occupant's head, according to an embodiment of the present invention.

FIG. 2 is a block diagram of a headrest positioning system 60 that automatically adjusts the position of a headrest 62 relative to a vehicle seat 64 consistent with the discussion above. The system 60 is used in combination with a position detection system 66 that provides a signal indicative of the position of a physical feature of the seat occupant 12, such as his head, eyes, nose, etc. Many systems are known in the art that use imaging or vision technology for determining the position of a particular feature of a person within a vehicle for various purposes.

The signal of the position of the seat occupant's feature from the position detection system 66 is sent to a seat module controller 68 that controls the position of the seat cushion and seat back of the seat 64 through various motors and the like. Many different seat positioning systems are known in the art that are applicable for the system 60. The position of the seat cushion and seat back can be preset in a memory so that the seat occupant can simply activate a switch that provides all of the positions of the seat 64, including the headrest 62. Signal lines for the motors in the seat 64 are provided by the seat module controller 68 to control the position of the seat, and sensor signals from positioning sensors in the seat 64 tell the seat module controller 68 the position of the seat parts. Power seat switches 70 can be used to separately adjust the several parts of the seat 64 if desired.

The signal from the position detection system 66 and the seat position signals from the seat module controller 68 are provided to a headrest system controller 72. The headrest system controller 72 controls the position of the headrest 62, either automatically or manually, consistent with the discussion herein. The headrest system controller 72 provides motor signals to the motors within the headrest 62, representing the actuators 26 and 28. Sensor signals from the headrest 62 indicating the position of the headrest 62 are sent to the headrest controller 72 so that it knows the position of the headrest 62. The sensors used to identify the position of the headrest 62 can be any sensor suitable for this purpose, such as a potentiometer. A power headrest switch 74 is used to control the position of the headrest 62 by the seat occupant if desired. In one embodiment, the power switch 74 over-rides the automatic positioning of the headrest 62.

Figure 3:
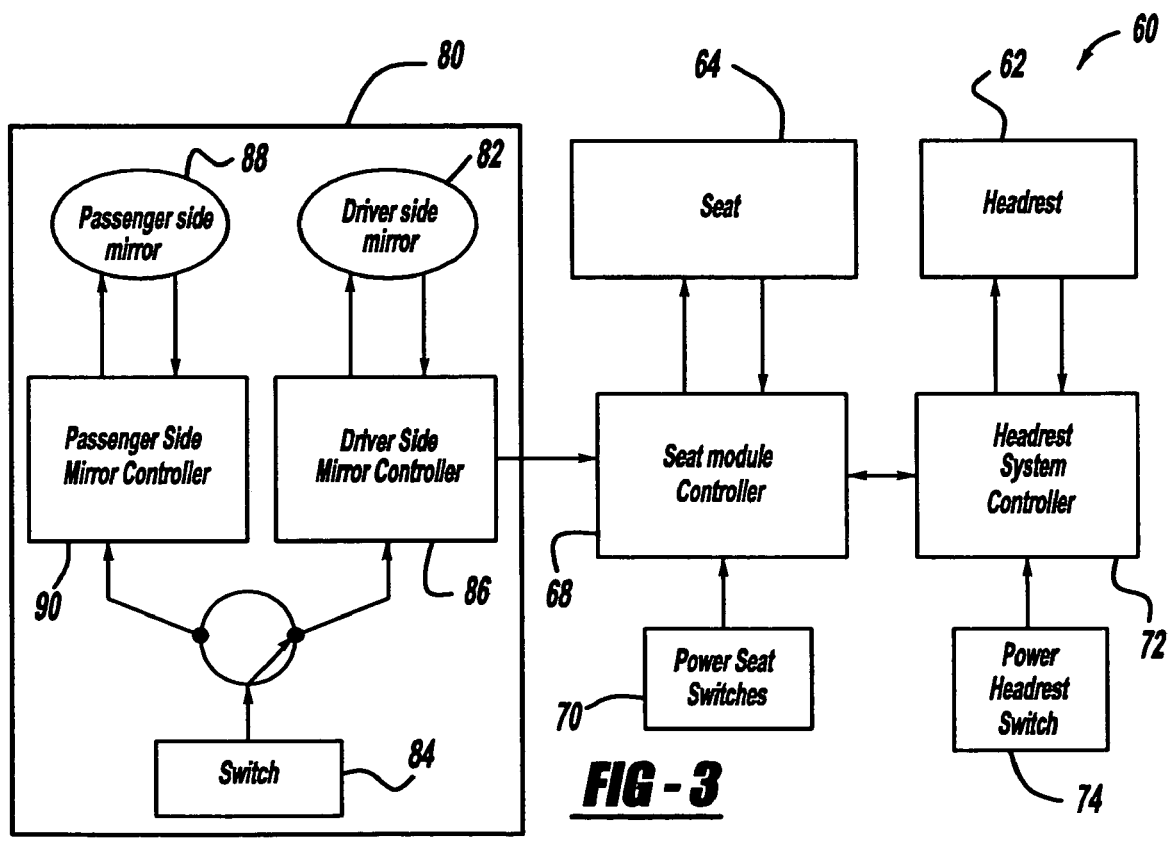
FIG. 3 is a block diagram of an automatic power headrest positioning system for automatically positioning the headrest based on the position of the driver side mirror, according to another embodiment of the present invention.

FIG. 3 is a block diagram of the headrest positioning system 60 used in combination with a power side mirror system 80 including a driver side mirror 82. The position of the driver side mirror 82 is used to determine the position of the driver's eyes for the seat module controller 68. In other words, the power side mirror system 80 provides a signal to the seat module controller 68 indicative of the position of the driver's eyes based on the position of the driver side mirror 82. The vehicle operator uses an adjustment switch 84 to adjust the position of the driver side mirror 82 through a driver side mirror controller 86. The driver side mirror controller 86 provides motor signals to the motors in the driver side mirror 82, and receives sensor signals from sensors of the position of the driver side mirror 82 so that it knows the position of the mirror 82. The driver can also use the adjustment switch 84 to control a passenger side mirror 88 through a passenger side mirror controller 90 in the same manner.

U.S. Pat. No. 6,840,637 titled Exterior Rearview Mirror System, assigned to the Assignee of this application and herein incorporated by reference, discloses an exterior rear view mirror system that automatically adjusts the position of the passenger side mirror in response to changes made by the vehicle operator to the drivers side mirror. The mirror system disclosed in the '637 patent can be used as the power side mirror system 80 in one embodiment.

Figure 4:
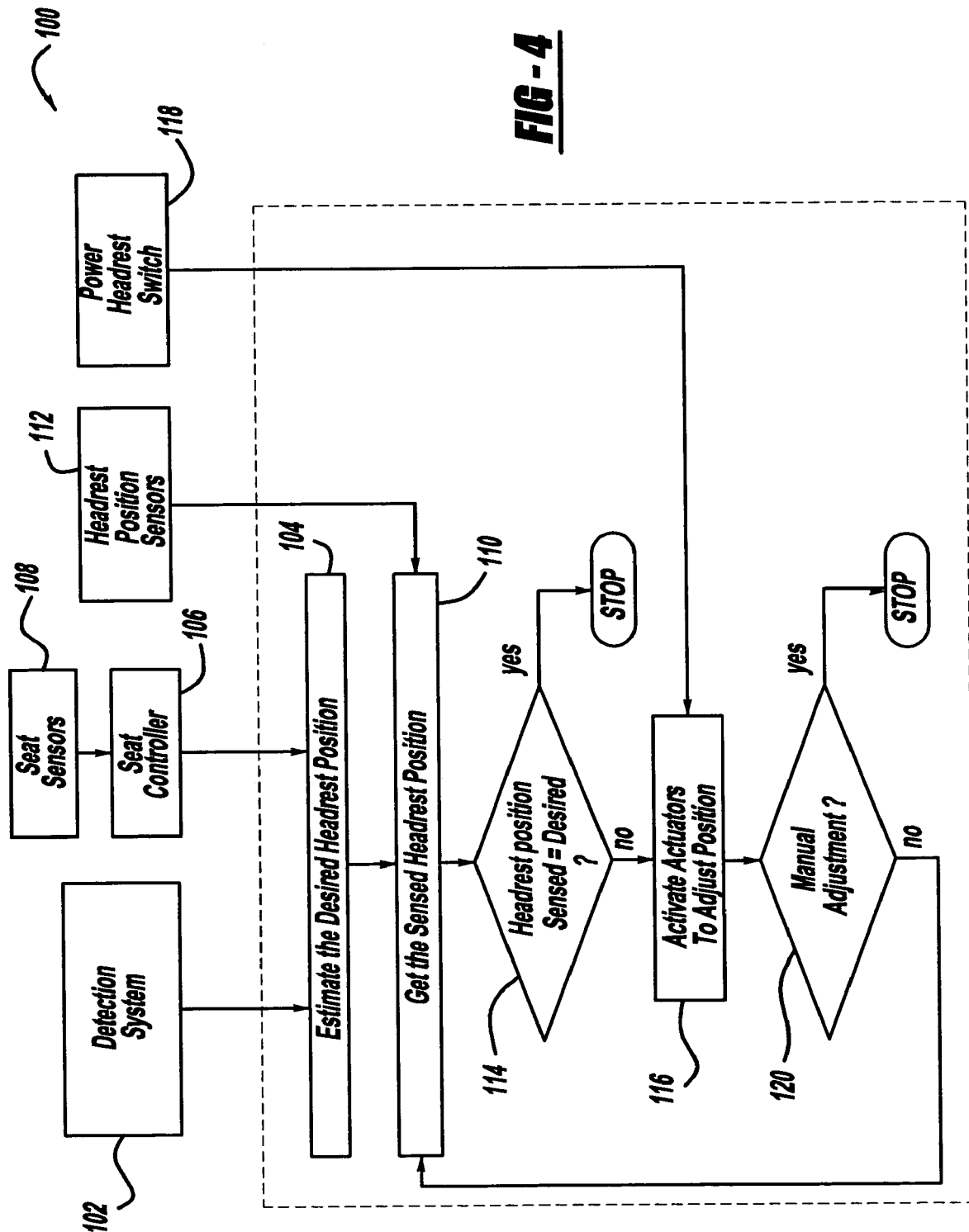
FIG. 4 is a flow chart diagram showing a process for automatically positioning a headrest of a vehicle seat for both of the headrest positioning systems shown in FIGS. 2 and 3, according to an embodiment of the present invention.

FIG. 4 is a flow chart diagram 100 showing one process for automatically controlling the position of the headrest 18, according to an embodiment of the present invention. A seat occupant detection system 102 provides a signal of the position of the seat occupant to a box 104 that estimates the desired position of the headrest 18. The detection system 102 can be the position detection system 66, the power side mirror system 80, or any other system suitable for the purposes described herein for identifying the position of the seat occupant's head. Additionally, the box 104 receives the seat position signals from a seat controller 106, representing the seat controller 68, that receives seat position signals from seat sensors 108. The algorithm determines the desired position of the headrest 18 at the box 104 and then gets the detected position of the headrest 18 at box 110 from headrest position sensors 112.

The algorithm then determines whether the current position of the headrest 18 is at the desired position of the headrest 18 for the seat occupant's head at decision diamond 114. If the position of the headrest 18 is at the desired position, then the algorithm is through. However, if the position of the headrest 18 is not at the desired position at the decision diamond 114, then the algorithm activates the headrest actuators 26 and 28 to adjust the position of the headrest 18 at box 116. The seat occupant can then manually adjust the position of the headrest 18 using a power headrest switch 118 that is detected by the algorithm if he is not satisfied with the automatic position of the headrest 18. The algorithm determines whether a manual adjustment to the headrest 18 has been made at decision diamond 120, and if the seat occupant has manually adjusted the position of the headrest 18, then the algorithm does not provide the automatic adjustment thereafter. However, if the seat occupant has not adjusted the position of the headrest 18 at the decision diamond 120, then the algorithm returns back to getting the sensed position of the headrest 18 at the box 110.

As discussed above, one embodiment of the present invention determines where to automatically position the headrest 18 based on the position of the driver side mirror, which provides the position of the driver's eyes. However, two techniques are known in the art for setting the position of the side mirrors of a vehicle. The first technique is referred to as a blind zone side mirror setting method where the vehicle operator sets the side mirrors of the vehicle so that the normal blind zones of the vehicle are not covered.

Figure 5:
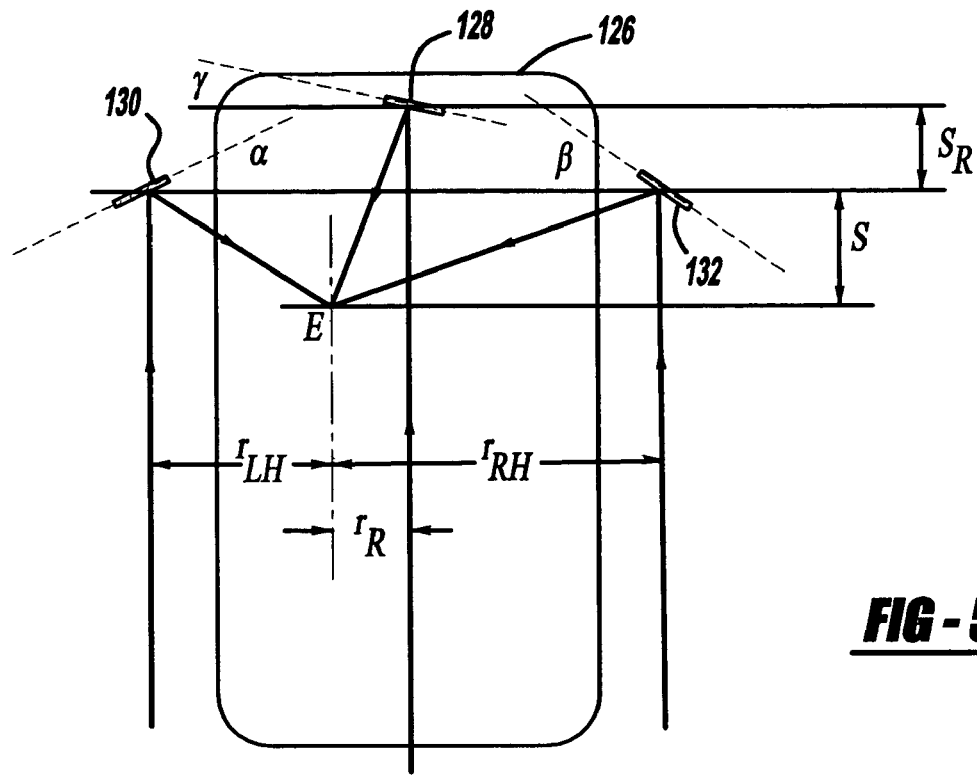
FIG. 5 is a top plan view of a vehicle showing a process for determining the position of a vehicle operator's eyes for a blind zone side mirror setting method for the headrest positioning system shown in FIG. 3.
Figure 6:
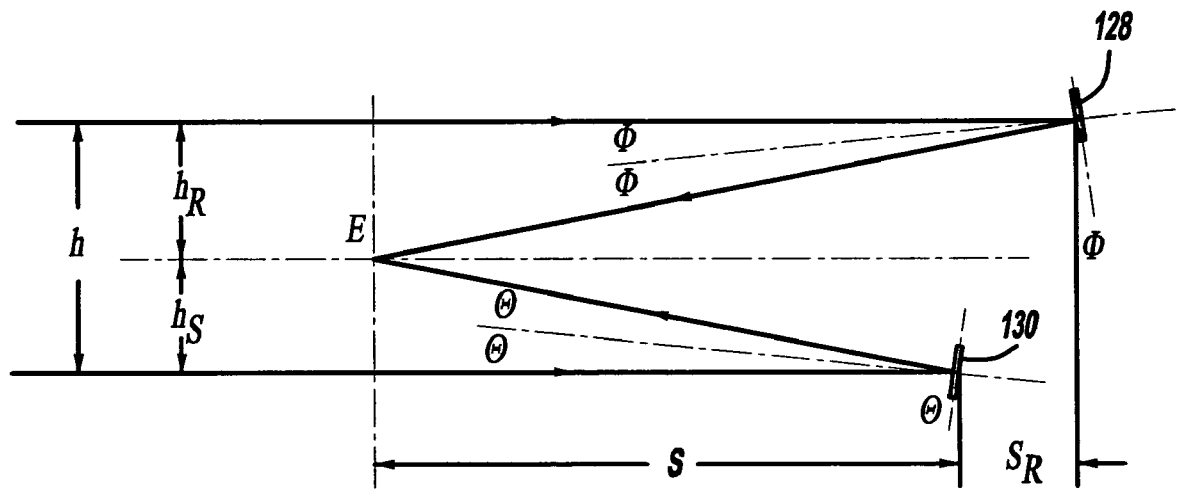
FIG. 6 is a side plan view of the vehicle for determining the position of the vehicle operator's eyes for the blind zone side mirror setting method.

FIG. 5 is a top view and FIG. 6 is a side view of a vehicle 126 including a rear view mirror 128, a driver side mirror 130 and a passenger side mirror 132. Point E represents the position of the driver's eyes, and point S is the distance from the driver's eyes to the driver side mirror 130 in a forward direction. From these diagrams, the following equations are used to determine the position E for the system above that calculates the desired position of the headrest 18 for the blind zone side mirror setting method.

$$S = \frac{r_{LH}}{\tan 2\alpha} \quad (11)$$

$$h_s = S \tan 2\theta \quad (12)$$

It is also known in the art to set the position of the side mirrors of a vehicle to help to eliminate the blind spots, referred to in the art as a blind zone/glare elimination (BGE) side mirror setting method. In this method, the vehicle operator moves his head to the far left to set the driver side mirror and the far right to set the passenger side mirror. This allows the side mirrors to be used to better see the vehicle blind spots when the driver is in the normal driving position, where the rearview mirror is used to view the remainder of the area behind the vehicle.

Figure 7:
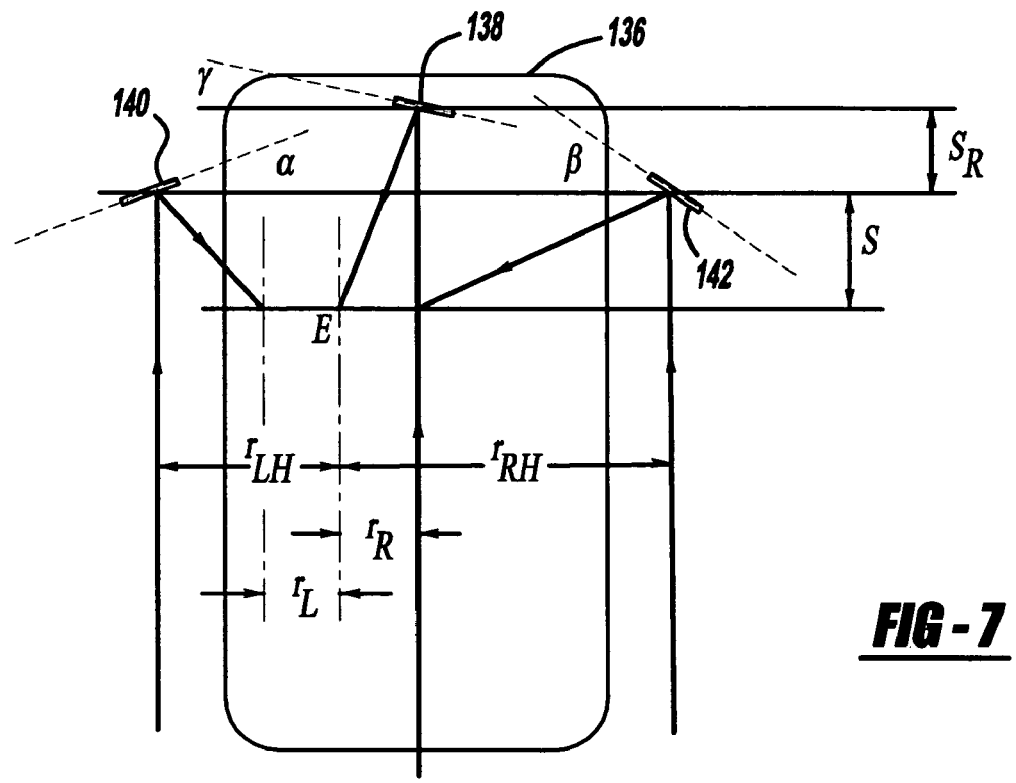
FIG. 7 is a top plan view of a vehicle showing a process for determining the position of a vehicle operator's eyes for a blind zone/glare elimination side mirror setting method for the headrest positioning system shown in FIG. 3.
Figure 8:
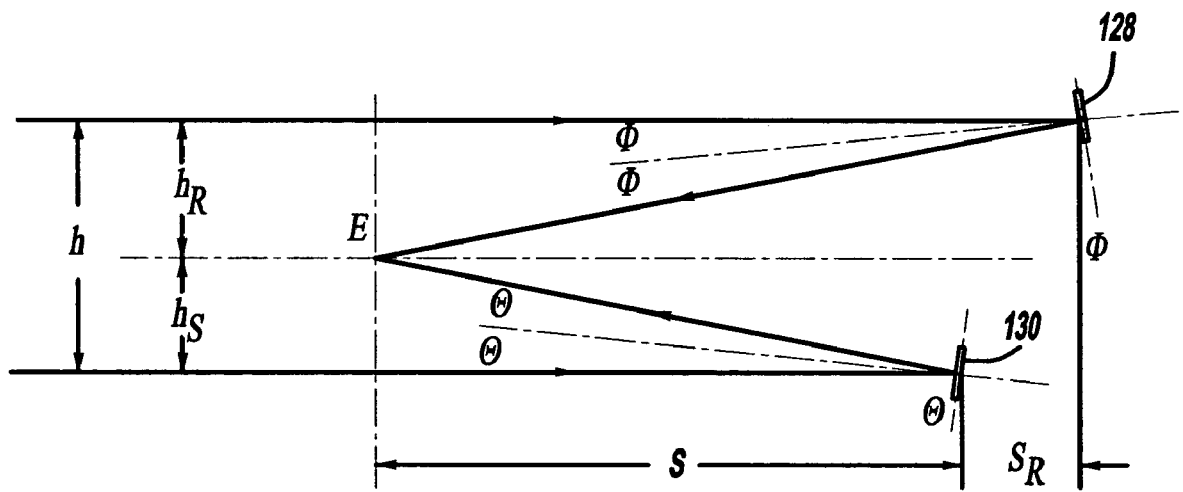
FIG. 8 is a side plan view of the vehicle for determining the position of the vehicle operator's eyes for the blind zone/glare elimination side mirror setting method.

FIG. 7 is a top view of a vehicle 136 and FIG. 8 is a side view of the vehicle 136 showing the BGE side mirror setting method. The vehicle 136 includes a rearview mirror 138, a driver side mirror 140 and a passenger side mirror 142. The variables identified in FIGS. 7 and 8 are used to calculate the desired position of the driver's eye E based on the following equations for the BGE side mirror setting method.

$$S = \frac{r_{LH} - r_L}{\tan 2\alpha} \quad (13)$$

$$h_s = S \tan 2\theta \quad (14)$$

Figure 9:
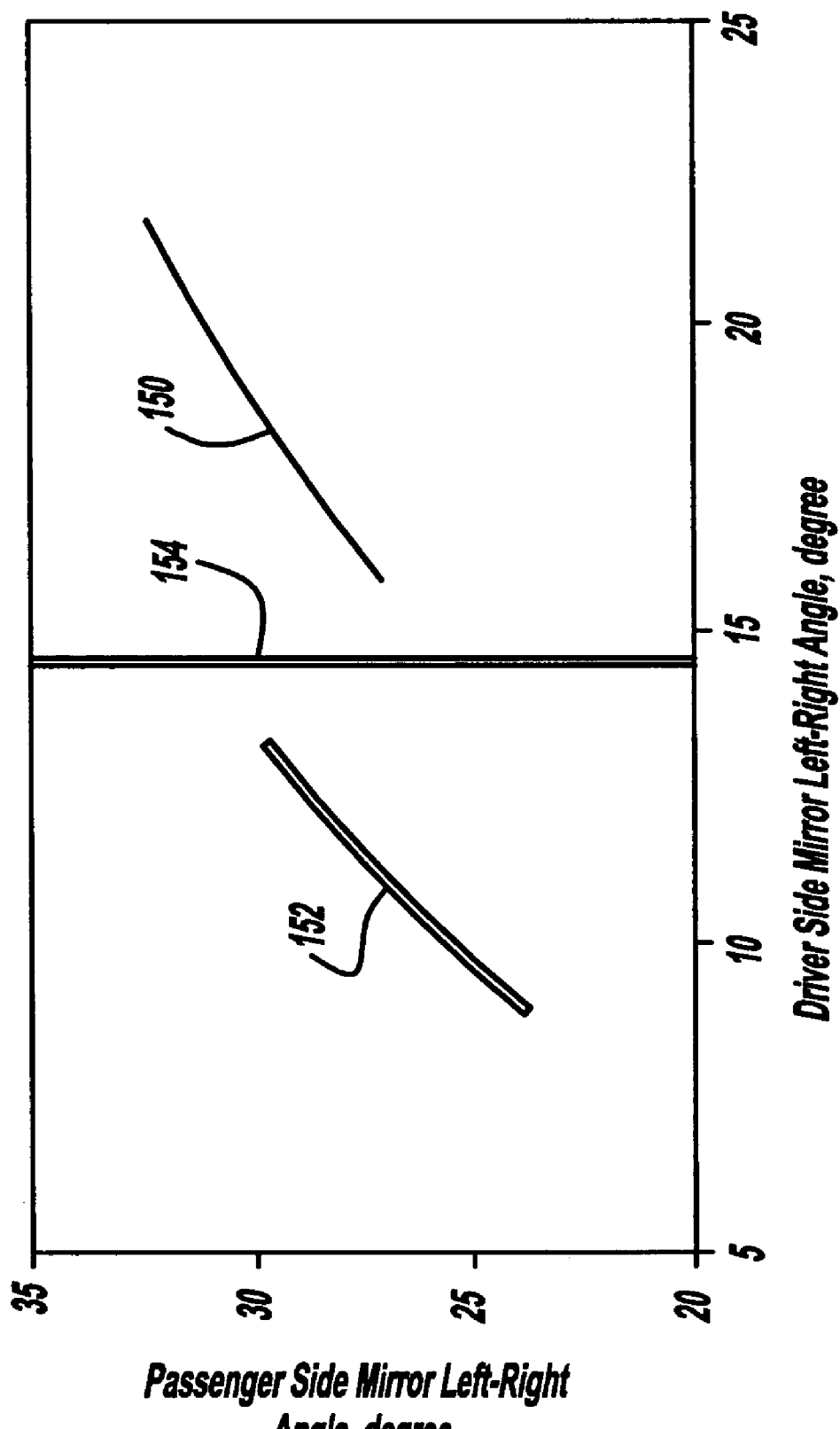
FIG. 9 is a graph with passenger side mirror left-right angle on the vertical axis and driver side mirror left-right angle on the horizontal axis showing the mirror setting angle for both the blind zone side mirror setting method and the blind zone/glare elimination side mirror setting method for a particular vehicle.

The question then remains, how does the automatic headrest positioning system of the invention know whether the vehicle operator has used the blind zone setting method or the BGE setting method to set the position of the side mirrors of the vehicle. FIG. 9 is a graph with driver side mirror left-right angle on the horizontal axis and passenger side mirror left-right angle on the vertical axis. For a particular vehicle, graph line 150 represents the position of the driver side mirror and passenger side mirror if the blind zone setting method is used and graph line 152 represents the position of the driver side mirror and the passenger side mirror if the BGE setting method is used. Therefore, the control algorithm of the headrest positioning system of the invention would know which method the vehicle operator used to set the side mirrors based on their angle, where line 154 represents a threshold between the two side mirror setting methods.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A headrest positioning system for automatically positioning a headrest of a vehicle seat, said system comprising:
    a headrest sensor for detecting the position of the headrest, said headrest sensor generating a headrest position signal indicative of the position of the headrest;
    a seat occupant detecting sub-system for detecting the position of a feature of a seat occupant seated in the vehicle seat, said seat occupant detecting sub-system generating a feature position signal indicative of the position of the feature, said seat occupant detecting sub-system including a driver side mirror detecting sub-system for detecting the position of a driver side mirror to detect the position of the seat occupant's eyes, said seat occupant detecting sub-system further including an imaging sub-system for detecting the position of the seat occupant's head; and
    a headrest position controller being responsive to the headrest position signal and the feature position signal, said controller generating a desired position of the headrest based on the position of the feature, said headrest position controller comparing the detected position of the headrest to the desired position of the headrest and automatically moving the headrest to the desired position, said headrest position controller moving the headrest to the desired position for the driver side mirror that has been set by either a blind zone side mirror setting method or a blind zone/glare elimination side mirror setting method.

2. The system according to claim 1 wherein the headrest position controller knows whether the driver side mirror has been set by the blind zone setting method or the blind zone/glare elimination setting method by a left-right angle of the driver side mirror.

3. The system according to claim 1 wherein the driver side mirror detecting sub-system automatically positions a passenger side mirror in response to the position of the driver side mirror.

4. The system according to claim 1 wherein the headrest position controller does not automatically position the headrest if the seat occupant over-rides the controller by manually adjusting the position of the head rest.

5. The system according to claim 1 wherein the headrest is part of a power seat adjusting sub-system including a power switch for adjusting the position of the headrest.

6. The system according to claim 5 wherein the position of the headrest can be preset in a memory function.

7. The system according to claim 1 further comprising at least one seat sensor for detecting the position of the vehicle seat, said headrest position controller being responsive to the seat position signal for helping to automatically adjust the position of the headrest.

8. The system according to claim 1 further comprising a rotational actuator for pivotally adjusting the position of the headrest and a linear actuator for linearly adjusting the position of the headrest.

9. A headrest positioning system for automatically positioning a headrest of a vehicle seat, said system comprising:
 a power seat adjusting sub-system including a power switch for positioning the headrest, a power switch for adjusting various positions of the seat, at least one seat sensor for detecting the position of the vehicle seat, and a headrest sensor for detecting the position of the headrest, said seat sensor generating a seat position signal indicative of the position of the seat and said headrest sensor generating a headrest position signal indicative of the actual position of the headrest;
 a seat occupant detecting sub-system for detecting the position of a feature of a seat occupant seated in the vehicle seat, said seat occupant detecting sub-system generating a feature position signal indicative of the position of the feature, said seat occupant detecting sub-system including a driver side mirror detecting sub-system for detecting the position of a driver side mirror to detect the position of the seat occupant's eyes; and
 a headrest position controller being responsive to the seat position signal, the headrest position signal and the feature position signal, said controller generating a desired position of the headrest based on the position of the feature and the position of the seat, said headrest position controller comparing the actual position of the headrest to the desired position of the headrest and automatically moving the headrest to the desired position, said headrest position controller moving the headrest to the desired position for a driver side mirror that has been set by either a blind zone side mirror setting method or a blind zone/glare elimination side mirror selling method.

10. The system according to claim 9 wherein the seat occupant detecting sub-system includes an imaging sub-system for detecting the position of the seat occupant's head.

11. The system according to claim 9 wherein the headrest position controller knows whether the driver side mirror has been set by the blind zone selling method or the blind zone/glare elimination setting method by a left-right angle of the driver side mirror.

12. A method for automatically positioning a headrest of a vehicle seat, said method comprising:
 detecting the position of the headrest;
 detecting the position of a feature of a seat occupant seated in the vehicle seat, wherein detecting the position of a feature of the seat occupant includes determining a position of a driver side mirror to determine the position of the seat occupant's eyes and determining the left-right angle of the driver side mirror to determine whether the driver side mirror has been set by a blind zone side mirror setting method or a blind zone/glare elimination side mirror selling method;
 determining a desired position of the headrest based on the position of the feature;
 comparing the detected position of the headrest to the desired position of the headrest; and
 automatically moving the headrest to the desired position.

13. The method according to claim 12 wherein detecting the position of a feature of the seat occupant includes using an imaging device to detect the position of the seat occupant's head.

14. The method according to claim 12 further comprising over-riding the automatic adjustment of the headrest by manually adjusting the position of the headrest.

15. The method according to claim 12 further comprising setting a position of the headrest as a preset in a memory function.

16. The method according to claim 12 further comprising detecting the position of the vehicle seat, and using the position of the vehicle seat to help provide the position of the headrest.

17. A headrest positioning system for automatically positioning a headrest of a vehicle seat, said system comprising:
 a headrest sensor for detecting the position of the headrest, said headrest sensor generating a headrest position signal indicative of the position of the head rest;
 a seat occupant detecting sub-system for detecting the position of a feature of a seat occupant seated in the vehicle seat, said seat occupant detecting sub-system generating a feature position signal indicative of the position of the feature, said seat occupant detecting sub-system including a driver side mirror detecting sub-system for detecting the position of a driver side mirror to detect the position of the seat occupant's eyes; and
 a headrest position controller being responsive to the headrest position signal and the feature position signal, said controller generating a desired position of the headrest based on the position of the feature, said headrest position controller comparing the detected position of the headrest to the desired position of the headrest and automatically moving the headrest to the desired position, said headrest position controller moving the headrest to the desired position for the driver side mirror that has been set by either a blind zone side mirror selling method or a blind zone/glare elimination side mirror setting method, wherein the headrest position controller knows whether the driver side mirror has been set by the blind zone setting method or the blind zone/glare elimination setting method by a left/right angle of the driver side mirror.

18. A headrest positioning system for automatically positioning a headrest of a vehicle seat, said system comprising:
 a headrest sensor for detecting the position of the headrest, said headrest sensor generating a headrest position signal indicative of the position of the head rest;
 a seat occupant detecting sub-system for detecting the position of a feature of a seat occupant seated in the vehicle seat, said seat occupant detecting sub-system generating a feature position signal indicative of the position of the feature, said seat occupant detecting sub-system including a driver side mirror detecting sub-system for detecting the position of a driver side mirror to detect the position of the seat occupant's eyes, wherein the driver side mirror detecting sub-system automatically positions a passenger side mirror in response to the position of the driver side mirror; and a headrest position controller being responsive to the headrest position signal and the feature position signal, said controller generating a desired position of the headrest based on the position of the feature, said headrest position controller comparing the detected position of the headrest to the desired position of the headrest and automatically moving the headrest to the desired position, said headrest position controller moving the headrest to the desired position for the driver side mirror that has been set by either a blind zone side mirror setting method or a blind zone/glare elimination side mirror setting method.

19. A headrest positioning system for automatically positioning a headrest of a vehicle seat, said system comprising:

a headrest sensor for detecting the position of the headrest, said headrest sensor generating a headrest position signal indicative of the position of the head rest;

a seat occupant detecting sub-system for detecting the position of a feature of a seat occupant seated in the vehicle seat, said seat occupant detecting sub-system generating a feature position signal indicative of the position of the feature, said seat occupant detecting sub-system including a driver side mirror detecting sub-system for detecting the position of a driver side mirror to detect the position of the seat occupant's eyes; and a headrest position controller being responsive to the headrest position signal and the feature position signal, said controller generating a desired position of the headrest based on the position of the feature, said headrest position controller comparing the detected position of the headrest to the desired position of the headrest and automatically moving the headrest to the desired position, said headrest position controller moving the headrest to the desired position for the driver side mirror that has been set by either a blind zone side mirror setting method or a blind zone/glare elimination side mirror setting method, wherein the headrest position controller does not automatically position the headrest if the seat occupant over-rides the controller by manually adjusting the position of the headrest.

20. A headrest positioning system for automatically positioning a headrest of a vehicle seat, said system comprising:

a headrest sensor for detecting the position of the headrest, said headrest sensor generating a headrest position signal indicative of the position of the head rest;

a seat occupant detecting sub-system for detecting the position of a feature of a seat occupant seated in the vehicle seat, said seat occupant detecting sub-system generating a feature position signal indicative of the position of the feature, said seat occupant detecting sub-system including a driver side mirror detecting sub-system for detecting the position of a driver side mirror to detect the position of the seat occupant's eyes; and a headrest position controller being responsive to the headrest position signal and the feature position signal, said controller generating a desired position of the headrest based on the position of the feature, said headrest position controller comparing the detected position of the headrest to the desired position of the headrest and automatically moving the headrest to the desired position, said headrest position controller moving the headrest to the desired position for the driver side mirror that has been set by either a blind zone side mirror setting method or a blind zone/glare elimination side mirror setting method, wherein the headrest is part of a power seat adjusting sub-system including a power switch for adjusting the position of the headrest.

21. The system according to claim 20 wherein the position of the headrest can be preset in a memory function.

22. A headrest positioning system for automatically positioning a headrest of a vehicle seat, said system comprising:

a headrest sensor for detecting the position of the headrest, said headrest sensor generating a headrest position signal indicative of the position of the head rest;

a seat occupant detecting sub-system for detecting the position of a feature of a seat occupant seated in the vehicle seat, said seat occupant detecting sub-system generating a feature position signal indicative of the position of the feature, said seat occupant detecting sub-system including a driver side mirror detecting sub-system for detecting the position of a driver side mirror to detect the position of the seat occupant's eyes;

a headrest position controller being responsive to the headrest position signal and the feature position signal, said controller generating a desired position of the headrest based on the position of the feature, said headrest position controller comparing the detected position of the headrest to the desired position of the headrest and automatically moving the headrest to the desired position, said headrest position controller moving the headrest to the desired position for the driver side mirror that has been set by either a blind zone side mirror setting method or a blind zone/glare elimination side mirror setting method; and a rotational actuator for pivotally adjusting the position of the headrest and a linear actuator for linearly adjusting the position of the headrest.

* * * * *